US010611884B2

(12) United States Patent
Samec et al.

(10) Patent No.: US 10,611,884 B2
(45) Date of Patent: Apr. 7, 2020

(54) ETHER FUNCTIONALIZED LIGNIN FOR FUEL PRODUCTION

(71) Applicant: REN FUEL K2B AB, Stockholm (SE)

(72) Inventors: Joseph Samec, Spanga (SE); Joakim Löfstedt, Uppsala (SE); Alexander Orebom, Uppsala (SE); Christian Dahlstrand, Uppsala (SE); Supaporn Sawadjoon, Uppsala (SE)

(73) Assignee: REN FUEL K2B AB, Stockholm (SE)

( * ) Notice: Subject to any disclaimer, the term of this patent is extended or adjusted under 35 U.S.C. 154(b) by 0 days.

(21) Appl. No.: 15/515,841

(22) PCT Filed: Nov. 3, 2015

(86) PCT No.: PCT/SE2015/051155
§ 371 (c)(1),
(2) Date: Mar. 30, 2017

(87) PCT Pub. No.: WO2016/072915
PCT Pub. Date: May 12, 2016

(65) Prior Publication Data
US 2017/0298192 A1  Oct. 19, 2017

(30) Foreign Application Priority Data
Nov. 3, 2014  (SE) ..................... 1451311

(51) Int. Cl.
*C08H 7/00* (2011.01)
*C10G 45/00* (2006.01)
(Continued)

(52) U.S. Cl.
CPC ................. *C08H 6/00* (2013.01); *C07G 1/00* (2013.01); *C08L 97/005* (2013.01);
(Continued)

(58) Field of Classification Search
CPC .......... C08H 6/00; C10G 1/002; C10G 1/065; C10G 3/50; C10G 11/00; C10G 45/00;
(Continued)

(56) References Cited

U.S. PATENT DOCUMENTS 2,410,578 A   11/1946  Giammaria
3,105,095 A    9/1963  Oshima et al.
(Continued)

FOREIGN PATENT DOCUMENTS

CN     1218777 A    6/1999
CN   101798534 A    8/2010
(Continued)

OTHER PUBLICATIONS

International Search Report and Written Opinion of the ISA for PCT/SE2015/051155, ISA/EP, dated Feb. 17, 2016.
(Continued)

*Primary Examiner* — James C Goloboy
(74) *Attorney, Agent, or Firm* — Harness, Dickey & Pierce, P.L.C.

(57) ABSTRACT

The present invention relates to a composition comprising lignin and a solvent where the lignin is functionalized with an ether group.

13 Claims, 3 Drawing Sheets

(51) Int. Cl.
*C10G 11/00* (2006.01)
*C07G 1/00* (2011.01)
*C09J 197/00* (2006.01)
*C09D 197/00* (2006.01)
*C08L 97/00* (2006.01)
*C10G 1/00* (2006.01)
*C10G 1/06* (2006.01)
*C10G 3/00* (2006.01)

(52) U.S. Cl.
CPC ...... *C09D 197/005* (2013.01); *C09J 197/005* (2013.01); *C10G 1/002* (2013.01); *C10G 1/065* (2013.01); *C10G 3/50* (2013.01); *C10G 11/00* (2013.01); *C10G 45/00* (2013.01); *C10G 2400/02* (2013.01); *C10G 2400/04* (2013.01); Y02P 30/20 (2015.11)

(58) Field of Classification Search
CPC .. C10G 2400/02; C10G 2400/04; C07G 1/00; C09D 197/005; C09J 197/005; C08L 97/005; Y02P 30/20
See application file for complete search history.

(56) References Cited

U.S. PATENT DOCUMENTS

| | | | |
|---|---|---|---|
| 3,905,926 A | 9/1975 | D'Alelio | |
| 3,984,363 A | 10/1976 | D'Alelio | |
| 4,420,644 A * | 12/1983 | Huibers | C07C 37/54 568/799 |
| 4,739,041 A | 4/1988 | Morrow et al. | |
| 5,094,295 A | 3/1992 | Morrow | |
| 5,925,182 A | 7/1999 | Patel et al. | |
| 7,998,905 B2 * | 8/2011 | Mazard | C09K 8/36 175/65 |
| 2007/0287640 A1 * | 12/2007 | Ballard | C09K 8/32 507/219 |
| 2012/0302699 A1 | 11/2012 | Kobune et al. | |
| 2013/0264060 A1 * | 10/2013 | De Wolf | C09K 8/528 166/305.1 |
| 2014/0121359 A1 * | 5/2014 | Thies | C07G 1/00 530/500 |
| 2015/0021027 A1 * | 1/2015 | Chapman | C09K 8/035 166/292 |

FOREIGN PATENT DOCUMENTS

| | | | |
|---|---|---|---|
| WO | 2012005784 A1 | 1/2012 | |
| WO | 2014/097108 A1 | 6/2014 | |
| WO | WO-2014097108 A1 * | 6/2014 | ............... B60C 1/00 |

OTHER PUBLICATIONS

F. E. Brauns et al: Lignin Ethers and Esters—Preparation from Lead and Other Metallic Derivatives of Lignin; Industrial and Engineering Chemistry; vol. 37. No. 1; Jan. 1, 1945 (Jan. 1, 1945). pp. 70-73.
EPO Search Report dated Jan. 23, 2018.

* cited by examiner

ETHER FUNCTIONALIZED LIGNIN FOR FUEL PRODUCTION

CROSS-REFERENCE TO RELATED APPLICATIONS

This application is a 371 U.S. National Stage of International Application No. PCT/SE2015/051155, filed on Nov. 3, 2015, which claims the benefit of and priority to Swedish Patent Application No. 1451311-3, filed on Nov. 3, 2014. The disclosures of the above applications are incorporated herein by reference.

FIELD OF THE INVENTION

The present invention relates to a composition of lignin and a solvent where the lignin has been substituted or functionalized with an ether group in order to increase the solubility of the lignin in suitable solvents.

BACKGROUND

There is an increasing interest in using biomass as a source for fuel production. Biomass includes, but is not limited to, plant parts, fruits, vegetables, processing waste, wood chips, chaff, grain, grasses, corn, corn husks, weeds, aquatic plants, hay, paper, paper products, recycled paper and paper products, lignocellulosic material, lignin and any cellulose containing biological material or material of biological origin.

An important component of biomass is the lignin present in the solid portions of the biomass. Lignin comprises chains of aromatic and oxygenate constituents forming larger molecules that are not easily treated. A major reason for difficulty in treating the lignin is the inability to disperse the lignin for contact with catalysts that can break the lignin down.

Lignin is one of the most abundant natural polymers on earth. One common way of preparing lignin is by separation from wood during pulping processes. Only a small amount (1-2%) is utilized in specialty products whereas the rest primary serves as fuel. Even if burning lignin is a valuable way to reduce usage of fossil fuel, lignin has significant potential as raw material for the sustainable production of chemicals and liquid fuels.

Various lignins differ structurally depending on raw material source and subsequent processing, but one common feature is a backbone consisting of various substituted phenyl propane units that are bound to each other via aryl ether or carbon-carbon linkages. They are typically substituted with methoxyl groups and the phenolic and aliphatic hydroxyl groups provide sites for e.g. further functionalization. Lignin is known to have a low ability to sorb water compared to for example the hydrophilic cellulose.

Today lignin may be used as a component in for example pellet fuel as a binder but it may also be used as an energy source due to its high energy content. Lignin has higher energy content than cellulose or hemicelluloses and one gram of lignin has on average 2.27 KJ, which is 30% more than the energy content of cellulosic carbohydrate. The energy content of lignin is similar to that of coal. Today, due to its fuel value lignin that has been removed using the kraft process, sulphate process, in a pulp or paper mill, is usually burned in order to provide energy to run the production process and to recover the chemicals from the cooking liquor.

There are several ways of separating lignin from black or red liquor obtained after separating the cellulose fibres in the kraft or sulphite process respectively, during the production processes. One of the most common strategies is ultra-filtration. Lignoboost® is a separation process developed by Innventia AB and the process has been shown to increase the lignin yield using less sulphuric acid. In the Lignoboost® process, black liquor from the production processes is taken and the lignin is precipitated through the addition and reaction with acid, usually carbon dioxide ($CO_2$), and the lignin is then filtered off. The lignin filter cake is then re-dispersed and acidified, usually using sulphuric acid, and the obtained slurry is then filtered and washed using displacement washing. The lignin is usually then dried and pulverized in order to make it suitable for lime kiln burners or before pelletizing it into pellet fuel.

Biofuel, such as biogasoline and biodiesel, is a fuel in which the energy is mainly derived from biomass material or gases such as wood, corn, sugarcane, animal fat, vegetable oils and so on. However the biofuel industries are struggling with issues like food vs fuel debate, efficiency and the general supply of raw material. At the same time the pulp or paper making industries produces huge amounts of lignin which is often, as described above, only burned in the mill. Two common strategies for exploring biomass as a fuel or fuel component are to use pyrolysis oils or hydrogenated lignin.

In order to make lignin more useful one has to solve the problem with the low solubility of lignin in organic solvents. One drawback of using lignin as a source for fuel production is the issue of providing lignin or lignin derivatives in a form suitable for hydrotreaters or crackers. The problem is that lignin is not soluble in oils or fatty acids which is, if not necessary, highly wanted.

Prior art provides various strategies for degrading lignin into small units or molecules in order to prepare lignin derivatives that may be processed. These strategies include hydrogenation, dexoygenation and acid catalyst hydrolysis. WO2011003029 relates to a method for catalytic cleavage of carbon-carbon bonds and carbon-oxygen bonds in lignin. US20130025191 relates to a depolymerisation and deoxygenation method where lignin is treated with hydrogen together with a catalyst in an aromatic containing solvent. All these strategies relates to methods where the degradation is performed prior to eventual mixing in fatty acids or oils. WO2008157164 discloses an alternative strategy where a first dispersion agent is used to form a biomass suspension to obtain a better contact with the catalyst. These strategies usually also requires isolation of the degradation products in order to separate them from unwanted reagents such as solvents or catalysts.

The economic benefits of producing fuels from biomass depend for example on an efficient process for preparing the lignin and on the preparation of the lignin or lignin derivatives so that the fuel production is as efficient as possible. For example the amount of oxygen should be as low as possible and the number of preparation steps should be as few as possible.

SUMMARY OF THE INVENTION

The object of the present invention is to overcome the drawbacks of the prior art and provide a composition comprising biomass and a solvent wherein the biomass comprises lignin. The solvent may comprise fatty acid or oil. In order to obtain the composition the lignin have been functionalized or modified by etherification. One application for the composition may be as a raw material for fuel production. By providing lignin dissolved in a solvent or carrier liquid acceptable to the refinery industry lignin becomes available for conventional refinery techniques instead of modified or specialized refinery techniques. The composition according to the present invention is also believed to result in lower cokes formation.

In the widest aspect the present invention relates to a composition comprising lignin or lignin derivatives and a solvent; wherein the lignin or lignin derivatives have been functionalized with ether groups.

In a first aspect the present invention relates to a composition comprising lignin and a solvent;
wherein the lignin has been functionalized with an ether group comprising an alkyl group, such as C5 or longer, and wherein the solvent comprises at least one fatty acid, esterified fatty acid or an oil such as a hydrocarbon or a mineral oil, or a mixture thereof, preferably at a content of at least 10 weight % of the total composition.

In a second aspect the present invention relates to a method of preparing the composition according to the present invention comprising
  providing lignin functionalized with an ether group comprising an alkyl group;
  providing a solvent comprising at least one at least one fatty acid, esterified fatty acid or an oil such as a hydrocarbon or a mineral oil, or a mixture thereof; and
  mixing the lignin functionalized with an ether group and the solvent.

In a third aspect the present invention relates to a method of making fuel by treating the composition according to the present invention in a hydrotreater or a catalytic cracker.

In a fourth aspect the present invention relates to a fuel obtained from the composition according to the present invention.

In a fifth aspect the present invention relates to the use of the composition to prepare fine chemicals such as aromatic compounds.

DETAILED DESCRIPTION OF THE INVENTION

Figure 1A:
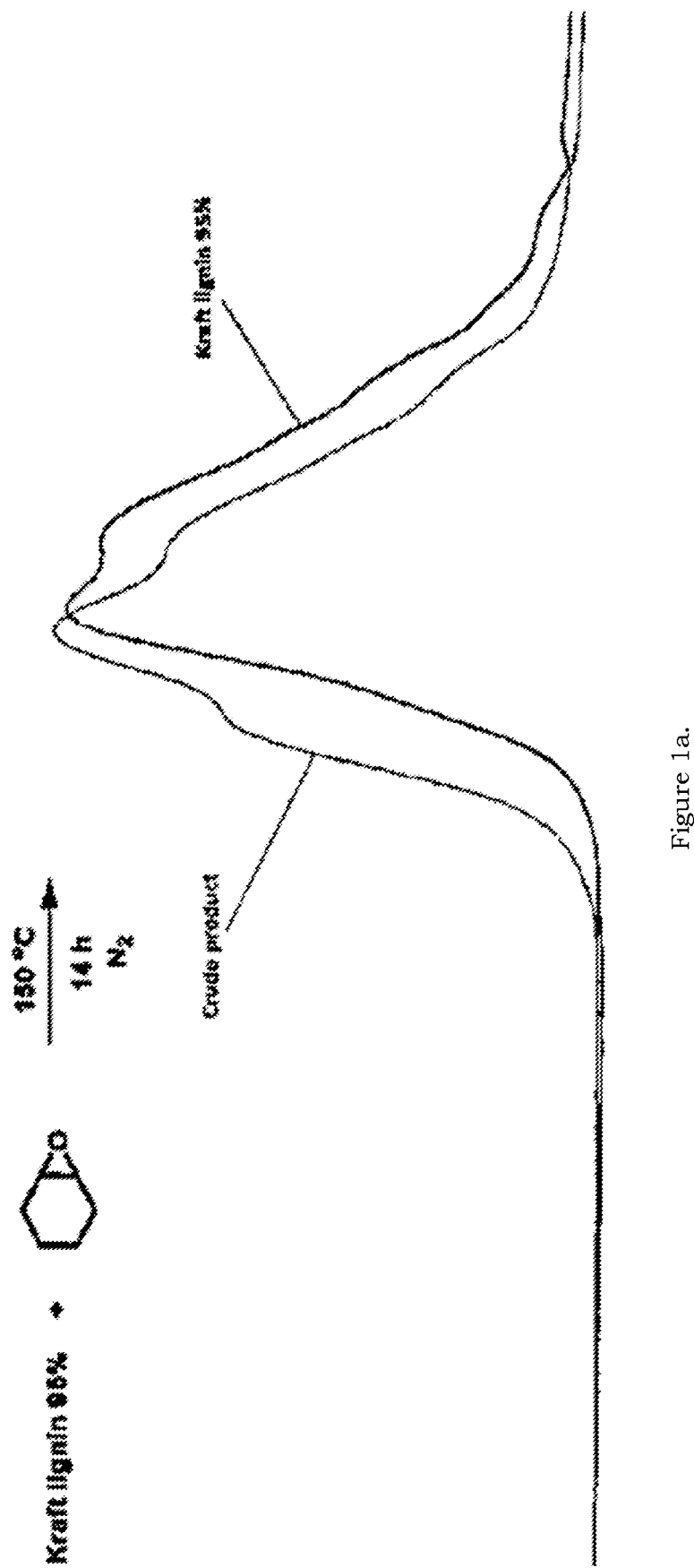
FIG. 1a-c, GPC of lignin and etherified lignin.

The present invention presents a composition for use in refinery processes for the production of various fuels.

In the present application the term "lignin" means polymer derived from the three monomers coniferyl alcohol, coumaryl alcohol and sinapyl alcohol.

In the present application the term "lignin derivative" means molecules or polymers derived from lignin. In the present application "lignin derivative" and "molecules or polymers derived from lignin" are used interchangeably. These molecules or polymers may be a result of chemical modification or degradation of lignin or a lignin source, for example when treating black or red liquor in order to precipitate or separate lignin. The average weight molecular weight of the lignin derivative may be 500 g/mol or higher, or 800 g/mol or higher.

In the present application the term "carrier liquid" means a liquid selected from fatty acids or mixture of fatty acids, rosin acid, mineral oil and hydrocarbon oils or mixtures thereof.

In the present invention the term "oil" means a nonpolar chemical substance that is a viscous liquid at ambient temperature and is both hydrophobic and lipophilic.

In the present application the terms "red liquor" and "brown liquor" denote the same liquor.

For a substance to be processed in a refinery such as an oil refinery or bio oil refinery, the substance needs to be in liquid phase. Either the substance is in liquid phase at a given temperature (usually below 80° C.) or the substance is solvated in a liquid. In this patent application, such liquid will be given the term solvent or carrier liquid. The present invention presents a composition and a method of preparing said composition where the composition comprises a biomass material, preferably lignin or lignin derivatives, where the biomass material is in liquid phase and may be processed in a refinery. The present invention makes it easier or even facilitates production of fuel from biomass material.

Lignin

In order to obtain lignin biomass may be treated in any suitable way known to a person skilled in the art. The biomass may be treated with pulping processes or organosolv processes for example. Biomass includes, but is not limited to wood, fruits, vegetables, processing waste, chaff, grain, grasses, com, com husks, weeds, aquatic plants, hay, paper, paper products, recycled paper, shell, brown coal, algae, straw, bark or nut shells, lignocellulosic material, lignin and any cellulose containing biological material or material of biological origin. In one embodiment the biomass is wood, preferably particulate wood such as saw dust or wood chips. The wood may be any kind of wood, hard or soft wood, coniferous tree or broad-leaf tree. A non-limiting list of woods would be pine, birch, spruce, maple, ash, mountain ash, redwood, alder, elm, oak, larch, yew, chestnut, olive, cypress, banyan, sycamore, cherry, apple, pear, hawthorn, magnolia, sequoia, walnut, karri, coolabah and beech.

It is preferred that the biomass contains as much lignin as possible. The Kappa number estimates the amount of chemicals required during bleaching of wood pulp in order to obtain a pulp with a given degree of whiteness. Since the amount of bleach needed is related to the lignin content of the pulp, the Kappa number can be used to monitor the effectiveness of the lignin-extraction phase of the pulping process. It is approximately proportional to the residual lignin content of the pulp.

$$K \approx c*1$$

K: Kappa number; c: constant ≈6.57 (dependent on process and wood); 1: lignin content in percent. The Kappa number is determined by ISO 302:2004. The kappa number may be 20 or higher, or 40 or higher, or 60 or higher. In one embodiment the kappa number is 10-100.

The biomass material may be a mixture of biomass materials and in one embodiment the biomass material is black or red liquor, or materials obtained from black or red liquor. Black and red liquor contains cellulose, hemi cellulose and lignin and derivatives thereof. The composition according to the present invention may comprise black or red liquor, or lignin obtained from black or red liquor.

Black liquor comprises four main groups of organic substances, around 30-45 weight % ligneous material, 25-35 weight % saccharine acids, about 10 weight % formic and acetic acid, 3-5 weight % extractives, about 1 weight % methanol, and many inorganic elements and sulphur. The exact composition of the liquor varies and depends on the cooking conditions in the production process and the feedstock. Red liquor comprises the ions from the sulfite process (calcium, sodium, magnesium or ammonium), sulfonated lignin, hemicellulose and low molecular resins.

The lignin according to the present invention may be Kraft lignin, sulfonated lignin, Lignoboost® lignin, precipitated lignin, filtrated lignin, acetosolv lignin or organosolv lignin. In one embodiment the lignin is Kraft lignin, acetosolv lignin or organosolv lignin. In another embodiment the lignin is Kraft lignin. In another embodiment the lignin is organosolv lignin. In another embodiment the lignin obtained as residual material from ethanol production. The lignin may be in particulate form with a particle size of 5 mm or less, or 1 mm or less.

Native lignin or Kraft lignin is not soluble in most organic solvents, fatty acids or oils. Instead prior art have presented various techniques to depolymerize and covert the depolymerized lignin into components soluble in the wanted media.

When the biomass material comprises lignin or lignin derivatives the number average molecular weight (mass) ($M_n$) of the lignin may be 30,000 g/mol or less, such as not more than 20,000 g/mol, or not more than 10,000 g/mol, or not more than 5,000 g/mol, or not more than 2,000 g/mol, or not more than 1,000 g/mol, but more than 500 g/mol or higher, or 800 g/mol or higher. In one embodiment the number average molecular weight of the lignin is between 500 and 4,000 g/mol, or between 700 and 2,000 g/mol.

Solvent and Carrier Liquids

According to the present invention the solvent may comprise a carrier liquid such as fatty acid, esterified fatty acid or oil (hydrocarbon or mineral oil). In one embodiment the carrier liquid is a mixture of esterified fatty acid and an oil. In one embodiment the carrier liquid is a mixture of fatty acid and an hydrocarbon oil. The solvent may also comprise an organic solvent. The solvent may also be a mixture of a carrier liquid and an organic solvent.

The purpose of the carrier liquid is to carry the wanted substrate or solution into the reactor without reacting or in any other way affecting the substrate or solution. Therefore, in one embodiment of the present application the carrier liquid is an inert hydrocarbon with a high boiling point, preferably at least 150° C.

The carrier liquid should preferably be suitable for a hydrotreater or a catalytic cracker (cat cracker), preferably a liquid suitable for both hydrotreater and catalytic cracker. Hydrotreating and catalytic cracking are common steps in the oil refinery process where the sulfur, oxygen and nitrogen contents of the oil is reduced and where high-boiling, high molecular weight hydrocarbons are converted into gasoline, diesel and gases. During hydrotreating the feed is normally exposed to hydrogen gas (20-200 bar) and a hydrotreating catalyst (NiMo, CoMo or other HDS, HDN, HDO catalyst) at elevated temperatures (200-500° C.). The hydrotreatment process results in hydrodesulfurization (HDS), hydrodenitrogenation (HDN), and hydrodeoxygenation (HDO) where the sulphurs, nitrogens and oxygens primarily are removed as hydrogensulfide, ammonia, and water. Hydrotreatment also results in the saturation of olefins. Catalytic cracking is a category of the broader refinery process of cracking. During cracking, large molecules are split into smaller molecules under the influence of heat, catalyst, and/or solvent. There are several sub-categories of cracking which includes thermal cracking, steam cracking, fluid catalyst cracking and hydrocracking. During thermal cracking the feed is exposed to high temperatures and mainly results in homolytic bond cleavage to produce smaller unsaturated molecules. Steam cracking is a version of thermal cracking where the feed is diluted with steam before being exposed to the high temperature at which cracking occurs. In a fluidized catalytic cracker (FCC) or "cat cracker" the preheated feed is mixed with a hot catalyst and is allowed to react at elevated temperature. The main purpose of the FCC unit is to produce gasoline range hydrocarbons from different types of heavy feeds. During hydrocracking the hydrocarbons are cracked in the presence of hydrogen. Hydrocracking also facilitates the saturation of aromatics and olefins.

In one embodiment the carrier liquid is a fatty acid or a mixture of fatty acids. In another embodiment the carrier liquid is an esterified fatty acid such as triglyceride. The esterified fatty acid may he any suitable fatty acid esterified with any suitable group. The fatty acid used in the present invention (as fatty acid or as esterified fatty acid) may be a C8 or longer fatty acid, or a C14 or longer fatty acid. In another embodiment the fatty acid or the mixture of the fatty acids comprises unsaturated fatty acids, preferably at a concentration of more than 25 wt %, or more than 50 wt %. In one embodiment the carrier liquid is a tall oil. In another embodiment the carrier liquid is a hydrocarbon oil or a mineral oil. In yet another embodiment the carrier liquid is a mixture of a fatty acid and a hydrocarbon oil or a mineral oil. The ratio in said mixture may be 10-90 wt % fatty acid and 10-90 wt % of hydrocarbon oil or mineral oil, for example 20-40 wt % fatty acid and 60-80 wt % of hydrocarbon oil or mineral oil.

When the carrier liquid is or comprises a hydrocarbon oil the oil needs to be in liquid phase below 80° C. and preferably have boiling points of 177-371° C. These hydrocarbon oils include different types of or gas oils and likewise e.g. light cycle oil (LCO), Full Range Straight Run Middle Distillates, Hydrotreated, Middle Distillate, Light Catalytic Cracked Distillate, distillates Naphtha full-range straight-run, Distillates, hydrodesulfurized full-range, Distillates, solvent-dewaxed straight-range, Distillates, straight-run middle sulfenylated, Naphtha clay-treated full-range straight run, Distillates full-range atm, Distillates hydrotreated full-range, Distillates, straight-run light, Distillates heavy straight-run, Distillates (oil sand), straight-run middle-run, Naphtha (shale oil), hydrocracked, full-range straight run (example of but not restricted to CAS nr: 68476-30-2, 68814-87-9, 74742-46-7, 64741-59-9, 64741-44-2, 64741-42-0, 101316-57-8, 101316-58-9, 91722-55-3, 91995-58-3, 68527-21-9, 128683-26-1, 91995-46-9, 68410-05-9, 68915-96-8, 128683-27-2, 195459-19-9). Moreover substances can be solvated in lighter hydrocarbon fractions such as organic solvents e.g. mesitylene, toluene, benzene, petroleum ether, octanes, nonanes, decanes and also isomerized derivatives of these compounds or mixtures thereof (CAS nr: 108-88-3, 108-67-8, 71-43-2, 8032-32-4, 111-65-9, 111-84-2, 124-18-5).

The composition may comprise an organic solvent, or a mixture of organic solvents, or a mixture of an organic solvent and a fatty acid, esterified fatty acid and/or an oil. The organic solvent may be but is not limited to oxygenates such as an alcohol, ester, ketone, ether, furane or furfural based solvent. The alcohol may be a diol or a triol. Preferred solvents are C1-C10 alcohols, C1-C10 aldehydes, C2-C15 ketones, C2-C10 ethers, and C2-C10 esters, for example methanol, ethanol, propanol, isopropanol, glycerol, and butyl ether such as tert-butyl methyl ether; diethyl ether, diglyme, diisopropyl ether, dimethoxyethane, diethylene glycol, diethyl ether, polyethylene glycol 1,4-dioxane and tetrahydrofuran, methylated tetrahydrofuran. In one embodiment the solvent is a cyclic ether such a tetrahydrofuran or methylated tetrahydrofuran. Preferred C1-C10 esters are organic esters, aromatic or non-aromatic esters, examples of esters are benzyl benzoate, various acetates such as methyl acetate, ethyl acetate, cyclopentyl methyl ether and butyl acetate, various lactates such as ethyl lactates. In one embodiment the solvent is an alkyl acetate such as methyl acetate or ethyl acetate. Aromatic solvents may be benzene, toluene or xylene. The organic solvent may also be pyridine or may comprise pyridine. In one embodiment the solvent is dichloromethane or chloroform. In one embodiment the solvent is toluene. In one embodiment the solvent comprises a combination of C1-C10 alcohols, C1-C10 ethers and C1-C10 esters. In one embodiment the solvent comprises two C1-C10 alcohols for example ethanol and glycerol, and in another embodiment the solvent comprises propanol and glycerol. In one embodiment the solvent comprises polyethylene glycol and a C1-C10 alcohol. In one embodiment the solvent comprises furfural or furfuryl alcohol. When the solvent is a mixture of an organic solvent and water the mixture may contain methanol and water, ethanol and water, isopropanol and water or ethyl acetate and water, preferably ethanol and water, isopropanol and water and ethyl acetate and water. In some applications for example in a refinery the amount of organic solvent should be as low as possible. In one embodiment the amount of organic solvent is 40 weight % or less, or 20 weight % or less, or 10 weight % or less, or 5 weight % or less or 2 weight % or less of the total weight of the composition. An organic solvent may increase the solubility of the etherified lignin or make the composition more homogenous when mixed with a carrier liquid.

Additives

The composition may further comprise at least one additive. The additive may be any additive known to a person skilled in the art. In one embodiment the additive may further enhance the dissolution of the lignin or lignin derivatives. The additive may have the function of dissolving or breaking up inter molecular bonds between the lignin chains or the lignin derivatives. In one embodiment the additive is a polar compound or a salt.

Preparation of the Composition

The lignin according to the present invention has been functionalized with an alkyl group via an ether linkage and the functionalized lignin is formulated into a composition by mixing it with a solvent. The functionalization of the lignin will not lead to any crosslinking of lignin chains.

The composition according to the present invention may be prepared by first preparing the lignin that is functionalized with ether groups followed by mixing said functionalized lignin with the solvent or the carrier liquid. The ether functionalized lignin may be isolated from the etherification reaction mixture or the ether functionalized lignin may be left in the reaction mixture when mixed with the solvent or the carrier liquid. The etherification of the lignin may also be performed in situ, i.e. in the solvent or the carrier liquid. Then the biomass, the etherification agent and the solvent or carrier liquid and optionally a catalyst are mixed to form a slurry. The mixing can be done by stirring or shaking or in any other suitable way and the slurry is then heated. The etherification agent may be an epoxide. The etherification may be performed at 80° C. or higher, or 120° C. or higher, or 150° C. or higher, or 180° C. or higher. When the etherification of the lignin occurs in situ a homogenous composition of solvent and ether functionalized lignin, and optionally catalyst, is obtained. The catalyst and any other unwanted components may be removed afterwards.

The etherification may be done by first mixing the lignin or lignin derivatives with an amine forming a first mixture and then heating the first mixture. To the first mixture an epoxide is then added and a second mixture is obtained which is then heated. The formed ether functionalized lignin is then mixed with the solvent in order to form the composition according to the present invention. The amine may be an alkyl amine for example a C5 or longer alkyl amine, or a C12 or longer alkyl amine. In one embodiment the amine is dodecylamine. The temperature at which the first and the second mixtures are heated may be 100° C. or higher, or 150° C. or higher, or 180° C. or higher. The mixture may be pressurized or refluxed. The amine may be added in a 2:1 to 0.5:1 weight ratio to the lignin, such as 1.10:1 to 0.90:1 or close to 1:1. The epoxide may be added in a 2:1 to 0.5:1 weight ratio to the first mixture, such as 1.10:1 to 0.90:1 or close to 1:1.

The etherification may also be done by mixing lignin or lignin derivatives with a primary epoxide forming a first mixture and then heating the first mixture. To the first mixture may an anhydride be added forming a second mixture which is then heated. The epoxide may be a primary or a secondary. The primary epoxide may be an alkyl epoxide for example a C5 or longer alkyl epoxide, or a C12 or longer alkyl epoxide, or C18 or longer alkyl epoxide. The epoxide may be a fatty acid epoxide for example a C14-C18 fatty acid epoxide, preferably a C16-C18 fatty acid epoxide. A longer alkyl group on the epoxide is believed to increase the solubility in carrier liquids and non-polar organic solvents. A secondary epoxide is for example a fatty acid methyl ester epoxide (FAME epoxide). The epoxide is preferably a monoepoxide since a di-och polyepoxide would crosslink the lignin making it less soluble. The anhydride may be a C4-C10 anhydride. The temperature at which the first and the second mixtures are heated may be 100° C. or higher, or 150° C. or higher, or 180° C. or higher. The mixture may be pressurized or refluxed. The epoxide may be added in a 2:1 to 0.5:1 weight ratio to the first mixture, such as 1.10:1 to 0.90:1 or close to 1:1. The anhydride may be added in a 2:1 to 0.5:1 weight ratio to the lignin.

The degree of functionalization of the ether group expressed as number of equivalents to lignin repeating units may be 0.2 or higher, or 0.4 or higher, or 0.6 or higher, or 0.8 or higher. In this application the repeating unit of lignin is assumed to have a molecular weight of 180 g/mol.

The modified lignin (the etherified lignin) according to the present invention may have a weight average molecular weight ($M_w$) of 1,000 g/mol or higher, or 1,200 g/mol or higher, or 1,500 g/mol or higher, or 1,800 g/mol or higher, or 2,000 g/mol or higher, or 2,500 g/mol or higher, or 3,500 g/mol or higher but less than 10,000 g/mol, or less than 6,000 g/mol. In one embodiment the number average molecular weight ($M_n$) is 1,500 to 4,000 g/mol, or 2,200 g/mol to 3,700 g/mol.

Molecular weight in the present application is determined using GPC (Gel Permeation Chromatography) operated at 20° C. and at flow rate of 1 ml/min using THF as solvent. Polystyrene Standard RedayCal Set M(p) 250-70000 (16 standards) (Sigma product no: 76552). The colons are Styragel THF (pre-colon), Styragel HR 3 THF (7.8×300 mm), Styragel HR 1 THF (7.8×300 mm), Styragel HR 0.5 THF (7.8×300 mm) all from Waters.

One advantage of the present invention is that a higher amount of lignin may be dissolved in a carrier liquid. The amount of lignin or lignin derivatives in the composition according to the present invention may be 1 weight % or more, or 2 weight % or more, or 4 weight % or more, or 5 weight % or more, or 7 weight % or more, or 10 weight % or more, or 12 weight % or more, or 15 weight % or more, or 20 weight % or more, or 25 weight % or more, or 30 weight % or more, or 40 weight % or more, or 50 weight % or more, or 60 weight % or more, or 70 weight % or more, or 75 weight % or more.

Source of Biomass and Pre-treatments

When the method of the present invention is performed using black or red liquor the liquor may be pre-treated by evaporation, separation or filtration or via chemical treatments such as the process described below and further defined in WO2012/121659.

The biomass material in the composition may have been treated with the process described in WO2012/121659 which is hereby incorporated by reference. The process relates to reduction of a substrate wherein said substrate can be but is not limited to primary, secondary and tertiary benzylic or allylic alcohol, benzylic or allylic ether, benzylic or allylic carbonyl, and benzylic or allylic ester, or olefins to the corresponding hydrocarbon. The substrate may be lignin or any other compound or polymer comprising said functional group, or black or red liquor. A general method comprises adding a catalyst, a transition metal catalyst, to a reaction flask or container. Adding a solvent mixture of at least two solvents where one of the solvents is water and a base.

The mixture is then heated followed by addition of a hydrogen donor and the substrate to be reduced. In order to inhibit disproportionation, a base or carbon dioxide should be added to the solvent mixture and catalyst prior to addition of a hydrogen donor and the substrate. The hydrogen donor may for example be formic acid or an alcohol, it may even be hydrogen gas. The reduction is performed at a temperature of 40-100° C. In one embodiment the amount of base is not stoichiometric to the amount of the substrate. The biomass material or preferably the separated lignin and lignin derivatives obtained from the reduction method may then be used as the biomass material in the composition according to the present invention. In one embodiment the obtained biomass material from the chemical reduction is further treated with filtration, ultra-filtration or cross-flow ultra-filtration; or treated with acidification and separation such as the Lignoboost® technique.

In another embodiment the composition of the present invention may comprise a biomass material comprising lignin or lignin derivatives obtained through precipitation and separation of lignin and lignin derivatives for example by acidification and separation, such as filtration. Lignoboost® or any other similar separation technique are examples of such technique and may be used. The separated lignin and lignin derivatives may then be used as the biomass material in the composition according to the present invention. In another embodiment the separated lignin and lignin derivative may further be chemically reduced using the method described above and in WO2012/121659.

Another method or a complimentary method for purifying or separating specific components in a biomass material is through filtration, ultra-filtration or cross-flow ultra-filtration. When the biomass material comprises lignin or lignin derivatives, the lignin may be separated in respect to size through any of said filtration techniques. The lignin or lignin derivatives may also be separated in respect to size through a depolymerisation technique; this separation may be performed in combination with filtration, ultra-filtration or cross-flow ultra-filtration. By using filtration, ultra-filtration or cross-flow ultra-filtration on black or red liquor lignin or lignin derivatives with molecular weights of 10,000 g/mol or less may be separated, preferably the separated lignin or lignin derivatives have a molecular weight of 2,000 g/mol or less, such as 1,000 g/mol or less. The separated lignin and lignin derivatives may then be used as the biomass material in the composition according to the present invention. In one embodiment the lignin and lignin derivatives obtained from said filtration may further be chemically reduced using the method described above and in WO2012/121659.

The composition according to the present invention may be used in a refinery process or as a pre-step to a refinery process for preparing fuel such as diesel and petrol, or diesel and petrol analogues; or biogasoline or biodiesel; or fuel additives. The composition may further be used to prepare lubricants, oils. For example synthetic oils with boiling point of at least 359° C.

Applications

The present invention may be used for preparing fuel or fuel additive. The composition according to the present invention may itself be used as a fuel additive.

The composition according to the present invention may be used in a refinery process or in a pre-step to a refinery process for preparing fuel such as diesel and petrol, or diesel and petrol analogues; or biogasoline or biodiesel; or fuel additives. The composition may further be used to prepare lubricants, oils. For example synthetic oils with boiling point of at least 359° C. The composition may therefore be treated in a refinery process comprising a hydrotreater or a catalytic cracker or both as described above.

The composition according to the present invention may also be used as an additive, for example as a concreted grinding aid, set retarder for cement, strengthener of cement, antioxidant, enhancer of thermal protection, stabilizer in asphalt, emulsifying agent, fiber strengthening additive, cross-linking agent, board binder, anti-corrosion additive, wear resistant additive, antifriction additive, binder, emulsifier or dispersing agent. In one embodiment the composition is used for preparing tyres.

The composition may further be used to prepare foams, plastics, rubbers or paint. The esterified lignin may be used as a cross-linking or curing agent, or as a water absorption inhibitor or as a fluidization agent. Mechanical properties may also be enhanced by the use of the composition. The composition may further be used as a raw material for preparing fine chemicals such as aromatic compounds using conventional techniques.

The composition may be added to surfaces to obtain dust control, or the composition may be used to prepare batteries.

EXAMPLES

Example 1

To acid precipitated lignin from black liquor was dodecylamine added in a 1:1 weight % proportion forming a mixture and heated at 150° C. over night. A fatty acid epoxide is then added in a 1:1 weight proportion to the mixture and heated again.

The etherification was determined using GPC and NMR.

Example 2

To acid precipitated lignin from black liquor was a primary epoxide (a C16 or C18) added in a 1:2.5 weight % proportion (lignin:epoxide) forming a mixture. An anhydride was then added to the mixture and left to react.

The etherification was determined using GPC and NMR.

Example 3

To acid precipitated lignin from black liquor was a primary epoxide (a C16 or C18) added in a 1:2.5 weight % proportion (lignin:epoxide) forming a mixture and heated at 150 or 200° C., respectively, for 5 hours.

The etherfication was determined using GPC and NMR.

Example 4

To acid precipitated lignin from black liquor (1508 g, 62.5% dry weight) was added technical grade 9,10-epoxyoctadecanoic acid methyl ester (3773 g) and resulting mixture was stirred at 50° C. and 20 mbar for 1 hour to remove water. The temperature was increased to 190° C. during 2 hours and was kept at 190° C. for 2 hours. The temperature was lowered below 130° C. and the product (4455 g) was poured into a steel drum.

The etherfication was determined using GPC and NMR.

Example 5

A composition comprising 90 wt % of vacuum gas oil (VGO) and 10 wt % of etherified lignin obtained according to Example 1 was prepared. Not all of the etherified lignin was dissolved.

Example 6

A composition comprising 90 wt % of vacuum gas oil (VGO) and 10 wt % of etherified lignin obtained according to Example 2 (C18) was prepared.

Example 7

To acid precipitated lignin from black liquor was a primary epoxide (C18) added in a 1:3.8 weight % proportion (lignin:epoxide) forming a mixture and heated at 150 or 200° C., respectively, for 5 hours.

Example 8

A composition comprising 81 wt % of vacuum gas oil (VGO) and 19 wt % of etherified lignin obtained according to Example 7 was prepared. The composition was hydrotreated to form hydrocarbons.

Example 9

The general procedure is
adding Kraft lignin 0.25 g, epoxide 0.25 g to a 25 ml microwave vial
capping the vial and flush with nitrogen for 10 min
stir the solution mixture at 150° C. under nitrogen for 14 h
dissolve with toluene 20 ml and then centrifuge
dissolve toluene-insoluble material with chloroform and then filter.

Figure 1B:
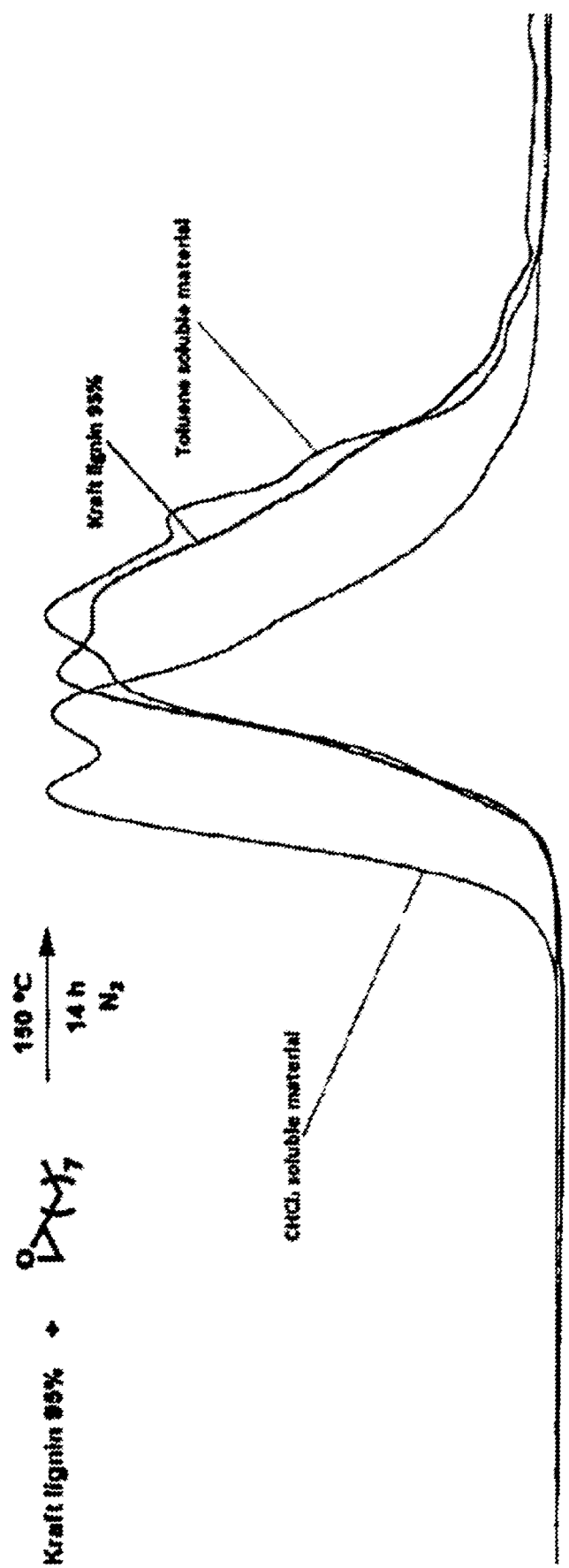
Figure 1C:
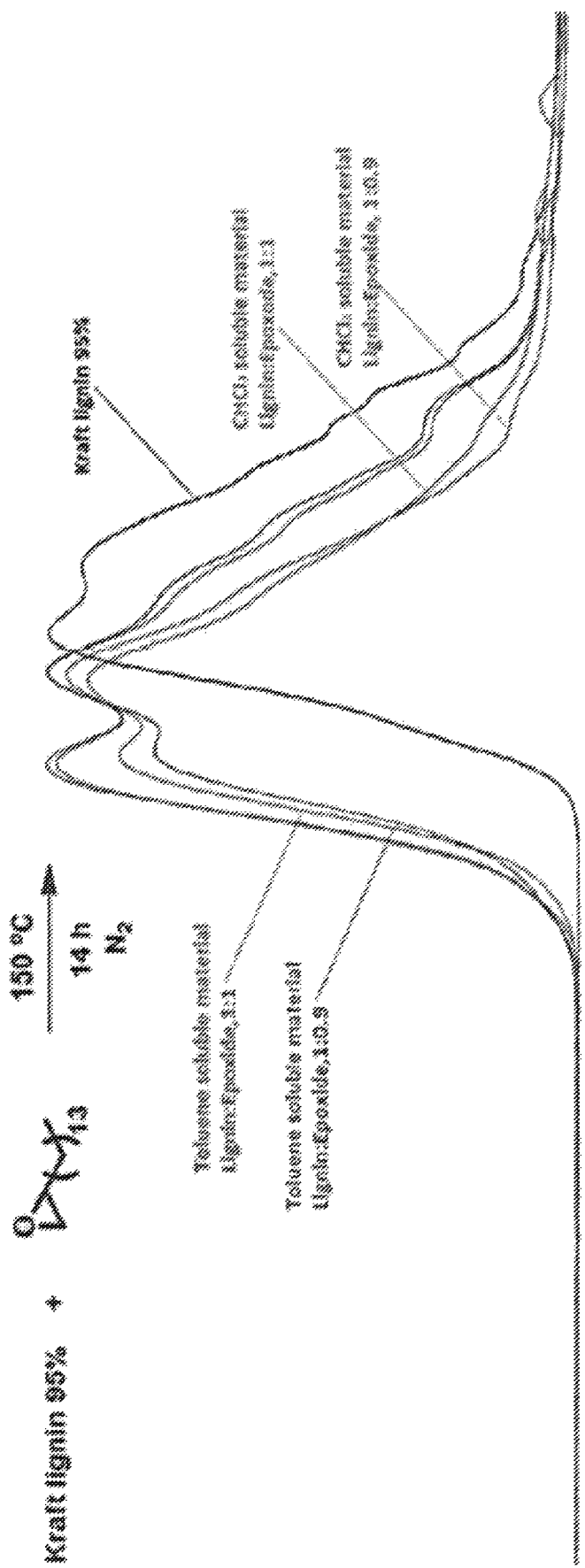

The GPC results from three different etherfications are shown in FIG. 1a-c.

The invention claimed is:
1. A composition comprising at least one of a lignin or lignin derivative, and a solvent;
wherein the lignin or lignin derivative has been functionalized with an ether group comprising a fatty acid methyl ester wherein the solvent comprises a carrier liquid including at least one of a fatty acid or esterified fatty acid or a mixture of at least one of a fatty acid or esterified fatty acid and at least one of a hydrocarbon oil or a mineral oil, wherein the total amount of the at least one hydrocarbon oil or mineral oil, if present, is at least 40 weight % of the total composition and whereby upon mixing at temperatures of at least 50° C., the lignin or lignin derivative is at least partially dissolved in the solvent.

2. The composition according to claim 1 wherein the solvent further comprises an organic solvent.

3. The composition according to claim 2 wherein the lignin content of the composition is 1 weight % or more.

4. The composition according to claim 1 in which the weight average molecular weight of the lignin or lignin derivative is not more than 2000 g/mol.

5. The composition according to claim 1 wherein the number of equivalents of ether groups to lignin repeating units is at least 0.2.

6. The composition according to claim 2 wherein the organic solvent is a sulfoxide, an alcohol or an aldehyde.

7. The composition according to claim 1 wherein the solvent further comprises hexane, toluene dimethyl sulfoxide, pyridine, THF, 1,4-dioxane, furfural, dipropylene glycol, polyethylene glycol or 1,3-propanediol, or a combination thereof.

8. The composition according to claim 1 wherein the composition is a one phase composition.

9. A method of producing a composition wherein the method comprises the steps of:
providing at least one of lignin or lignin derivative functionalized with an ether group comprising an alkyl group;
providing a solvent comprising at least one fatty acid, esterified fatty acid or an oil such as a hydrocarbon or a mineral oil, or a mixture thereof; and
mixing the at least one of lignin or lignin derivative functionalized with an ether group and the solvent; and
wherein the composition is heated during mixing to a temperature between 50 and 350° C.; and
wherein the composition comprises at least one of a lignin or lignin derivative, and a solvent, wherein the lignin or lignin derivative has been functionalized with an ether group comprising a C5 or longer alkyl group, or an ether group comprising a fatty acid or a fatty acid methyl ester wherein the solvent comprises at least one fatty acid, esterified fatty acid, or a hydrocarbon oil or a mineral oil, or a mixture thereof, such that upon combining the lignin or lignin derivative with the solvent, the lignin or lignin derivative is at least partially dissolved in the solvent.

10. The method according to claim 9 wherein the solvent is a fatty acid.

11. The method according to claim 9 wherein the lignin or lignin derivatives is derived from black or red liquor or lignin from ethanol production.

12. The method according to claim 9 wherein the lignin or lignin derivatives are obtained from:
chemical reduction using a transition metal catalyst;
acidification and separation;
filtration, ultra-filtration or cross-flow ultra-filtration; or
any combination thereof,
of black or red liquor or residual material from ethanol production.

13. A method of preparing fuel comprising treating the composition according to claim 1 comprising at least one of a lignin or lignin derivative, and a solvent, whereby upon combining the lignin or lignin derivative with the solvent, the lignin or lignin derivative is at least partially dissolved in the solvent after treatment in a hydrotreater or a catalytic cracker.

* * * * *